Figure 1:
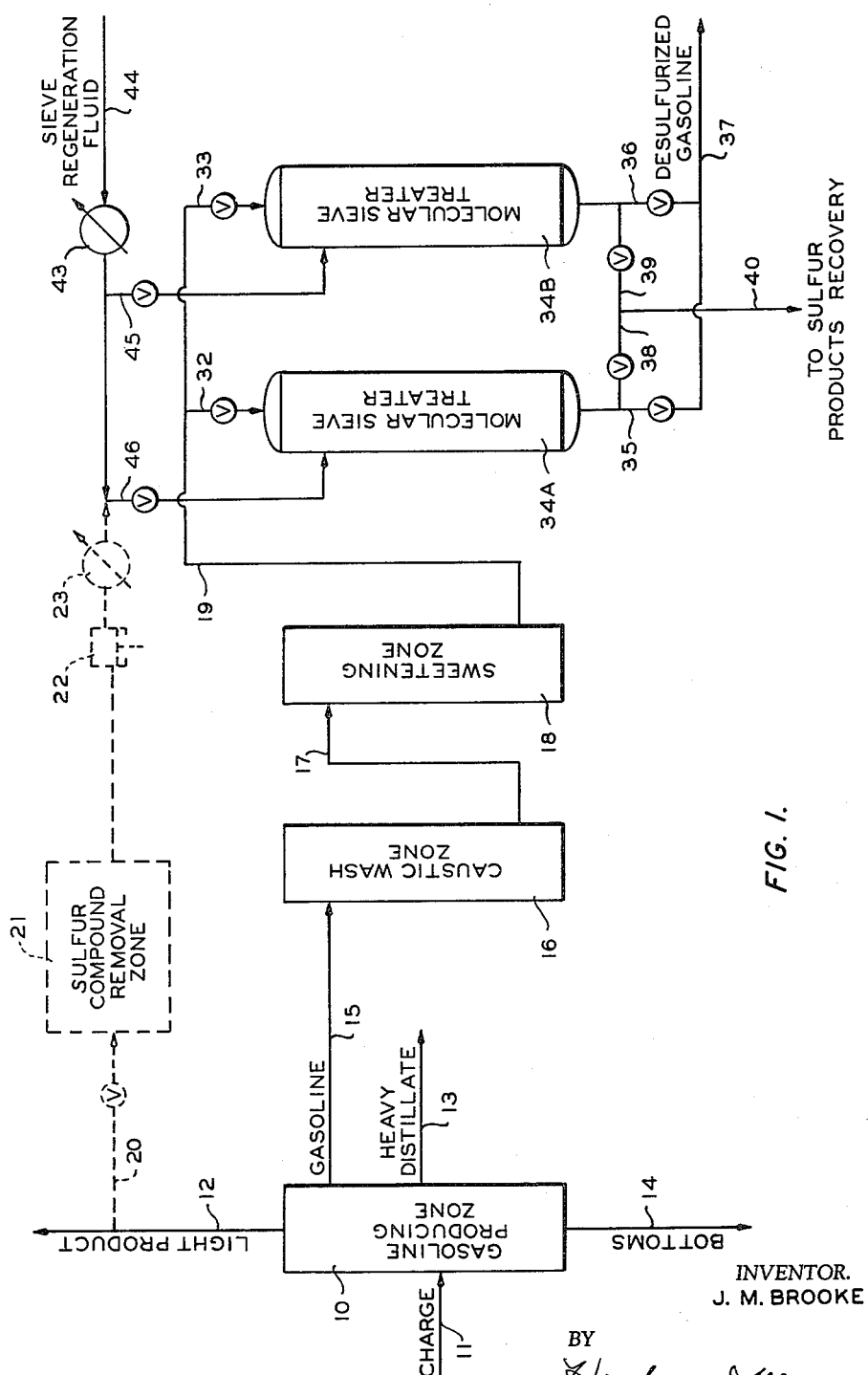

United States Patent Office 3,051,646
Patented Aug. 28, 1962

3,051,646
REMOVAL OF SULFUR MATERIALS FROM HYDROCARBONS
Jesse M. Brooke, Sweeny, Tex., assignor to Phillips Petroleum Company, a corporation of Delaware
Filed Mar. 13, 1961, Ser. No. 95,774
8 Claims. (Cl. 208—250)

This invention relates broadly to the desulfurization of hydrocarbons with molecular sieve adsorbents. In accordance with one aspect, this invention relates to a process for selectively removing sulfur and sulfur compounds such as mercaptans and/or disulfides from gasoline fractions comprising contacting said gasolines with molecular sieve adsorbent materials. In accordance with another aspect, this invention relates to a process for removing sulfur and sulfur compounds, such as disulfides from gasoline fractions that have been previously sweetened comprising contacting said sweetened gasolines with molecular sieve adsorbent materials. In accordance with another aspect, this invention relates to a process for purifying sulfur-containing hydrocarbon fractions utilized as feed stocks for hydrocarbon conversion processes comprising selectively removing sulfur compounds by contacting said feed stock with molecular sieve adsorbent materials. In accordance with still another aspect, this invention relates to a process for selectively removing sulfur compounds such as mercaptans from gasoline fractions utilized as reformer feed stocks comprising contacting said gasolines with molecular sieve materials.

This application is a continuation-in-part of my copending application having Serial No. 664,926, filed June 11, 1957, now abandoned.

The removal of sulfur and sulfur compounds from light petroleum distillates such as natural gasoline, refinery straight run and cracked gasolines, and the like, is of considerable importance in the refining of petroleum and is widely practiced. Sulfur compounds are particularly detrimental when present in motor fuels for example, due to their corrosiveness and their tendency to reduce the lead susceptibility of fuels such as gasolines. Further, the presence of sulfur compounds is very detrimental in feed stocks for various catalytic hydrocarbon conversion processes such as, for example, catalytic reforming operations, since the sulfur and sulfur compounds present in the feed poison the catalyst and, therefore, decrease the activity and useful life of the catalyst.

Various methods and reagents have either been used or proposed for the desulfurization, or sweetening, of hydrocarbon fractions such as the light petroleum distillates. Chemical reagents that have been used include solutions of sodium plumbite, alkaline sodium hypochlorite, alkali metal sulfides and polysulfides, and the like, as well as certain dry solid reagents such as dry copper chloride and the like. Most sulfur compounds can be removed from or converted to disulfides in light petroleum distillates such as the gasoline fractions or like mixtures of hydrocarbons by the above-mentioned reagents; however, in nearly all of these cases, the removal of sulfur and conversion of sulfur compounds to non-corrosive compounds is accompanied by some chemical effect upon or reaction with the hydrocarbon fractions present, either with the loss of a portion of such hydrocarbon fractions or with conversion of the hydrocarbons which then requires further treatment so that they can be used. Thus, this results in decreasing the value of the hydrocarbon fractions or increasing the cost of producing a finally usable product.

A number of solid adsorbent materials such as silica gel, carbon, and the like, and molecular sieve adsorbents having average pore diameters of from 4 to 5 angstroms, as disclosed in my copending application Serial No. 555,607, filed December 27, 1955, have been employed for the treatment of hydrocarbons. In said application, a process is disclosed and claimed for separating normal aliphatic hydrocarbons from a gasoline fraction by contacting said fraction with a molecular sieve adsorbent material having average pore diameters of about 5 angstroms to adsorb normal aliphatic hydrocarbons therefrom, and regenerating said adsorbent by contacting with hydrogen to desorb said adsorbed hydrocarbons. The use of solid adsorbents to remove sulfur compounds from hydrocarbons is old in the art; however, adsorbents such as silica gel not only remove the sulfur compounds present, but also remove aromatics and naphthenics present in the hydrocarbon fractions being treated. Molecular sieve adsorbent materials having pore diameters of about 5 angstroms, for example, do not adsorb aromatics nor naphthenics but do remove normal paraffins up to at least $C_{14}$ from hydrocarbon fractions being treated. In some refinery operations, such as the production of reformates, one does not want to remove naphthenics and aromatics, and, in the preparation of reforming charge stocks, one does not particularly want to remove normal paraffins present in the feed. Thus, it can be seen that for some catalytic reforming operations, it is highly desirous to have an adsorbent material, for example, which preferentially removes sulfur compounds, but does not remove naphthenics, aromatics and/or normal paraffins present in the hydrocarbon fractions being contacted.

Accordingly, an object of this invention is to provide an improved process for desulfurizing hydrocarbons. Another object of this invention is to provide a process for selectively removing sulfur and sulfur compounds, especially disulfides, from sweetened distillate fractions with molecular sieve materials. Another object of this invention is to provide an improved hydrocarbon conversion process. Another object of this invention is to provide an improved method of removing harmful contaminants such as sulfur and sulfur compounds from catalytic reforming feed stocks. Another object of this invention is to provide an improved method of effecting the selective removal of sulfur and sulfur compounds from gasoline fractions utilized as catalytic reformer feed stocks in order to prevent contamination of reforming catalyst. Other aspects, objects, as well as the several advantages of this invention are apparent from a study of the disclosure, the drawings, and the appended claims.

In acordance with the present invention, I provide an improved process for selectively removing sulfur and sulfur compounds from light petroleum distillates such as natural gasoline, refinery straight run and cracked gasolines, reformates, cracked naphtha fractions, kerosene, and the like, without materially affecting the hydrocarbon fractions and/or removing individual hydrocarbon components present in said fractions, said process comprising contacting said distillates with molecular sieve adsorbents having average pore diameters of at least 8 angstroms, preferably from 10 to about 200 angstroms, more preferably from 10 to about 20 angstroms. More particularly, I have found that mercaptans and/or disulfides as well as other sulfur compounds can be selectively removed from either sour or sweetened distillate fractions, especially sweetened gasoline fractions, such as natural gasoline, refinery straight run gasolines, and the like, by contacting said gasolines with molecular sieve adsorbents having average pore diameters of from 8 to about 20 angstroms without removing individual hydrocarbon components such as naphthenics, normal paraffins and/or aromatics from the gasoline fractions being contacted.

I have found, unexpectedly, that by increasing the average pore diameters of the molecular sieves ordinarily employed for hydrocarbon separation processes, that molecular sieve absorbents having average pore diameters of at least 8 angstroms, preferentially adsorb various sulfur compounds, such as mercaptans and/or disulfides, without materially adsorbing naphthenics, normal paraffins and/or aromatics present in the gasoline fractions being treated or contacted by the molecular sieve adsorbent. Further, I have found that gasoline fractions that have been previously sweetened, i.e., the mercaptan sulfur has been converted to disulfides by copper sweetening, for example, and then contacted with molecular sieve adsorbent materials having average pore diameters of at least 8 angstroms, the treated fraction exhibits an octane improvement as well as an improved TEL response. I have also found that substantially complete mercaptan sulfur removal can be obtained from gasoline fractions by contacting the gasoline fractions with the molecular sieve materials of the present invention, without appreciable removal of naphthenics, normal paraffins and/or aromatics present in the fractions.

The present invention is particularly advantageous when employed with straight run and/or cracked gasoline boiling range materials. In a presently preferred embodiment of the present invention there is provided for the production of a gasoline boiling range material comprising the steps of: recovering the gasoline from a gasoline producing zone; contacting the gasoline with a conventional caustic wash system to remove $H_2S$ and light mercaptans therefrom; contacting the resulting gasoline with a conventional sweetening reagent, such as cupric chloride impregnated clay, to convert the remaining mercaptans to disulfides, thusly providing a doctor sweet gasoline; contacting said doctor sweet gasoline preferably with a molecular sieve adsorbent having average pore sizes ranging from 8 to about 20 angstroms to remove the disulfides from the gasoline; and recovering a gasoline having an improved TEL response as a product of the process.

In accordance with another embodiment of the present invention, the feed to a catalytic reforming operation having been freed of $H_2S$ is first contacted with an adsorbent material of the invention to adsorb mercaptan sulfur therefrom without adsorption of normal paraffins, and is then catalytically reformed in the presence of hydrogen. This embodiment of the invention is particularly advantageous in that the sulfur compounds present in the reformer feed are selectively adsorbed, thereby providing a substantially sulfur-free feed which will not deactivate the reforming catalyst and, at the same time, the normal paraffins present in the feed are not adsorbed, thereby providing a very desirable reformer feed. Hydrogen, for example, from the catalytic reforming operation may be employed to desorb and thus regenerate the molecular sieve adsorbent material. The hydrogen after being employed to regenerate or reactivate the molecular sieve adsorbent and, after being freed of sulfur compounds, can be, if desired, returned to the catalytic reforming operation for reuse. The utilization of hydrogen to regenerate molecular sieve materials is disclosed in my copending application Serial No. 555,607, filed December 27, 1955.

The adsorption or molecular sieve materials applicable in the present invention are the various naturally occurring zeolites or synthetic zeolites. Applicable materials are the various crystalline alumino-silicates which have been heated to remove water of hydration. The adsorbent materials may be prepared by any of the well known methods in the art. Of the three classes of crystalline zeolites, fibrous, laminar, and rigid three dimensional anionic networks, the last mentioned class only is suitable in my invention. Examples of such materials include chabazite, phacolite, gmelinite, harmotome, and the like, or suitable modifications thereof, produced by base exchange. In the separation of sulfur and sulfur compounds from hydrocarbon fractions, without removal of naphthenics, normal paraffins and/or aromatics, I employ a molecular sieve adsorbent material having average pore diameters of at least 8 angstroms. The particular sieve used in the example and described in my invention is known in the trade as Linde Type 13–X molecular sieve. The adsorbent materials can be employed in granular form, such as ⅛ or ¼ inch pellets, or in finely divided form, such as up to 200 mesh. Contacting of the hydrocarbon fractions with the molecular sieve materials can be carried out in any suitable zone, such as a fixed bed, moving bed, or the like.

The process conditions employed for contacting the sulfur-containing hydrocarbon fractions with the molecular sieves of the present invention may vary considerably. A contacting temperature ranging from about 70 to about 200° F., preferably about 100 to about 120° F., a contacting pressure ranging from atmospheric to about 600 p.s.i.g., and volumes of hydrocarbon charge per volume of sieve ranging from about 0.5 to about 5.0 volumes, preferably 0.8 to 1.2 volumes, can be advantageously employed. The molecular sieve adsorbent materials of the present invention can be regenerated in any suitable maner such as by heating or purging with an inert gas, for example, or by hydrogen, such as is disclosed in my copending application Serial No. 555,607, filed December 27, 1955. If hydrogen from a catalytic reforming unit, for example, is employed to regenerate the molecular sieve material, a regeneration temperature ranging from about 300 to about 600° F., preferably 350 to 450° F., may be utilized. The regeneration of adsorbent materials can be carried out at any suitable pressure; however, it is generally preferred to carry out the regeneration at approximately system pressure such as used in a catalytic reforming operation, for example, which usually ranges from about 400 to about 1000 p.s.i.g.

Referring now to the drawings, the invention will be more fully explained. It will be understood that the drawings are diagrammatic in nature and are included for illustrative purposes only. Conventional apparatus such as pumps, heat exchangers, control instruments, etc., have, for the most part, been omitted for the sake of simplicity. The use of such equipment, however, is within the scope of the invention.

FIGURE 1 is a diagrammatic flow sheet illustrating one embodiment of the invention wherein gasoline from a gasoline producing zone, after caustic washing, is contacted first with a conventional cupric chloride impregnated clay sweetening agent to convert the mercaptan sulfur to disulfides, and then contacted with a molecular sieve adsorbent material of the present invention to remove the disulfides from the gasoline. Hydrogen from a catalytic reforming unit (or a portion of the gases produced in the gasoline forming zone after sulfur removal) may be utilized to regenerate the molecular sieve adsorbent. The regeneration hydrogen, after removal of sulfur materials, can be returned to the catalytic reforming unit.

Figure 2:
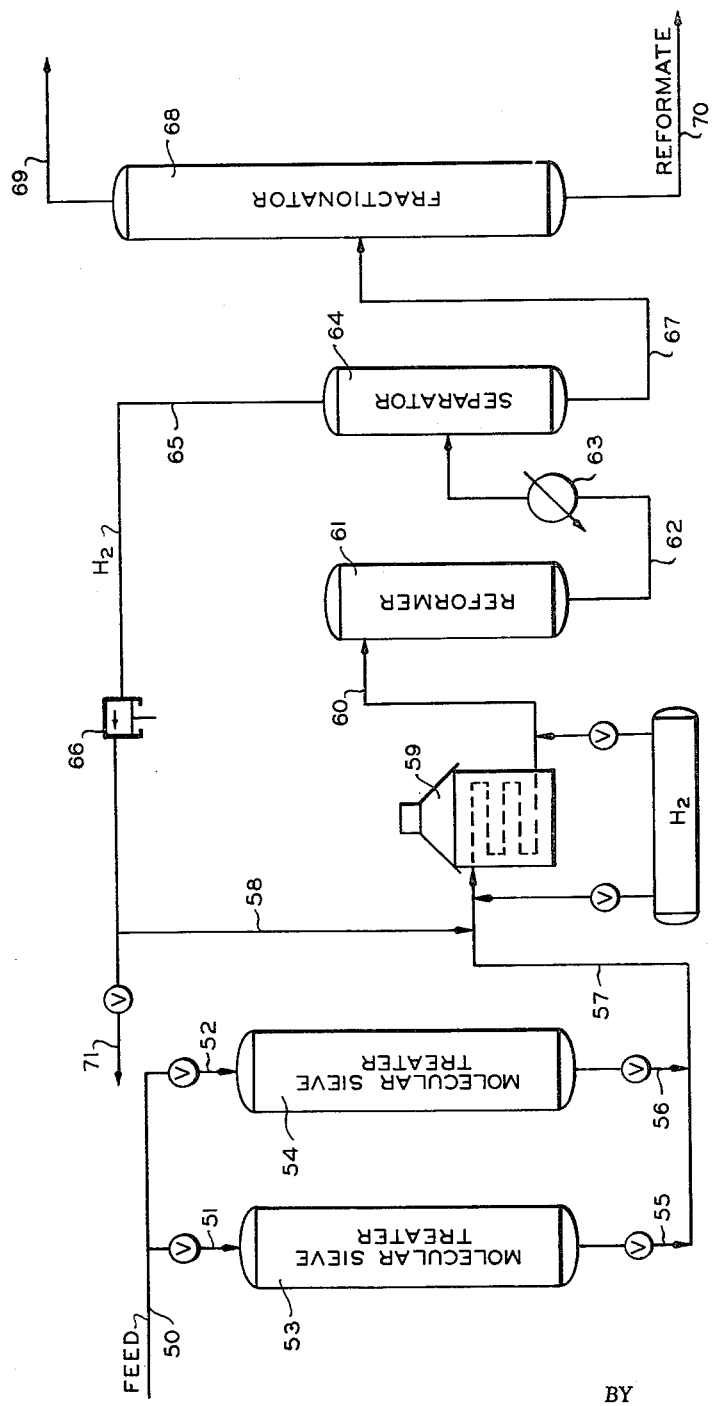

FIGURE 2 is a diagrammatic flow sheet illustrating another embodiment of the present invention, where the feed to the catalytic reformer is contacted with a molecular sieve adsorbent of the invention and hydrogen from the catalytic reformer can be employed to regenerate used adsorbent. The regeneration hydrogen, after removal of sulfur, can be returned to the catalytic reformer unit.

Referring particularly to FIGURE 1, the invention will be described as applied to upgrading or improving the anti-knock characteristics of a gasoline boiling range material. The crude oil is charged to the gasoline producing zone 10 via line 11. Zone 10 may be a distillation zone comprising furnaces, heat exchangers, reboiler, and various fractionating towers known in the art. From zone 10 are recovered materials of lower boiling range than gasoline via line 12, distillates of higher boiling range than gasoline via line 13, and residue via line 14. The gasoline boiling range material having an end point of about 400° F. is removed from zone 10 via line 15 and is processed in caustic washing zone 16 wherein H₂S and light mercaptans are removed therefrom. This caustic washing zone 16 is conventional and known to those skilled in the art. Caustic washed gasoline is passed via line 17 into sweetening zone 18 comprised of one or more vessels containing cupric chloride impregnated clay which converts the mercaptan sulfur present in the gasoline to disulfides. It should be realized that sweetening reagents other than cupric chloride impregnated clay can be advantageously employed in sweetening zone 18.

Sweetened gasoline containing disulfides is passed via lines 19 and 32 and is introduced into adsorption treating zone 34A. The gasoline is contacted in zone 34A with a molecular sieve adsorbent having average pore diameters of about 13 angstroms which adsorbs the disulfides from the gasoline, thereby producing a gasoline having an improved TEL response as illustrated by example hereinafter. The contacted gasoline is removed from adsorption zone 34A via conduits 35 and 37 and is passed to storage, or other use, as a product of the process.

In FIGURE 1, only one copper chloride treater and two molecular sieve adsorbent treaters are shown, the latter being shown as operated in parallel; however, it should be realized that more than one copper chloride treater and more than two molecular sieve adsorbent treaters can be satisfactorily utilized. In the operation illustrated, one of the adsorbent treaters is being utilized to treat gasoline while the other treater is being reactivated.

When the molecular sieve adsorbent in adsorption zone 34A has become spent, that is, it will no longer adsorb sulfur compounds, especially disulfides, the gasoline stream in line 19 is switched into line 33, and passed into treating or adsorption zone 34B wherein it is treated, as previously described, with fresh molecular sieve adsorbent. Treated gasoline is withdrawn from adsorption zone 34B via conduit 36, and passed to storage via conduit 37. After the gasoline stream has been switched into adsorption zone 34B, hydrogen is passed through conduit 44, heater 43, and conduit 46, and introduced into the upper portion of adsorption zone 34A. Said hydrogen contacts the used adsorbent and desorbs or removes the adsorbed disulfides therefrom. Desorbed disulfides, together with said regeneration hydrogen, are removed from the lower portion of adsorption zone 34A via conduit 38 and are passed via conduit 40 and introduced into any suitable conventional sulfur removal zone.

Sufficient hydrogen is passed through adsorption zone 34A so as to effect the regeneration of the used adsorbent and have it ready for reuse by the time the adsorbent in adsorption zone 34B has become spent. When the adsorbent in adsorption zone 34B has become spent, the gasoline in conduit 19 is switched back to adsorption zone 34A, and spent adsorbent in zone 34B is regenerated similarly as described for zone 34A. The use of plural adsorption chambers with alternate-stream and regeneration periods is well known to those skilled in the art, and no further description is believed necessary here. Also, while only two adsorption chambers for this service have been shown, it will be understood that any desirable number can be employed. Further, molecular sieve adsorbent materials of the present invention may be regenerated or desorbed by other gases such as inert gases, for example, nitrogen, etc., or the molecular sieve adsorbent materials may be heated to remove disulfides. However, the utilization of hydrogen as the desorbing gas is preferred. A suitable regeneration fluid can be a portion of the light product 12 produced in the process of making the gasoline 15 in zone 10. A portion of these light gases is passed by the system shown in dotted lines comprising conduit 20, sulfur compound removal zone 21, which may be a conventional caustic washing zone known to those skilled in the art, compressor 22, and heater 23. This heated compressed gas can then be used to reactivate the molecular sieve adsorbent system of my invention.

In the process illustrated in FIGURE 2, feed stock to a catalytic reforming unit is introduced via conduits 50 and 51 into treating or adsorption zone 53, where it is contacted with a molecular sieve adsorbent material having average pore diameters of about 13 angstroms wherein mercaptans are adsorbed therefrom without removal of aromatics, naphthenics, or normal paraffins in the feed. A reforming feed stock, which is substantially free of sulfur compounds, is withdrawn from adsorption zone 53 through conduit 55, together with hydrogen introduced from line 58, is passed via conduit 57 and introduced into furnace 59. After preheating to the desired temperature, said feed stock is passed via conduit 60 into reforming zone 61. The resulting reformate is passed through conduit 62 and cooler 63 and introduced into separator 64 wherein hydrogen is removed overhead through conduit 65, recompressed by compressor 66, and passed for recycle through conduit 58 to reformer 61. A substantially hydrogen free reformate is removed from separator 64 through conduit 67 and passed to fractionation zone 68 wherein the reformate is debutanized. Butane and lighter hydrocarbons are removed overhead through conduit 69 and passed to storage or for other use elsewhere in the refinery as desired. Debutanized reformate is removed from fractionation zone 68 through conduit 70 and passed to storage or for other use as desired.

When the adsorbent in adsorption zone 53 has become spent, the feed stock in line 50 is switched to conduit 52 and passed to adsorption zone 54 and used adsorbent in zone 53 is then regenerated by contacting the molecular sieve, for example, with hydrogen, introduced by line 71 and manifold, not shown; however, other regeneration gases may be used. The desorbed sulfur compounds, such as mercaptans, removed from adsorption zone 53 together with the regeneration gas, for example, hydrogen, are withdrawn from said zone and passed to a separator wherein sulfur compounds are separated from the regeneration gas. The regeneration gas may be reused to regenerate the adsorbers or, in the case of hydrogen, may be recycled to the reforming zone. Adsorption zones 53 and 54 are used alternately on stream and on regeneration, as described in connection with adsorption zones 34A and 34B in connection with FIGURE 1.

Operating conditions in the catalytic reforming zone will depend upon the type of material being reformed, the catalyst employed, and the type of product desired. These three variables are all interrelated as will be understood by those skilled in the art. Thus, any suitable reforming catalyst can be employed in reforming zone 61 of FIGURE 1. When reforming a gasoline boiling range material, an example of a presently preferred catalyst is one comprised of alumina, platinum in an amount of about 0.01 to 1.0 percent by weight of said alumina, halogen, preferably fluorine, in an amount within the range of about 0.1 to 8 percent by weight of said alumina. The catalyst can be prepared by any conventional method such as by precipitating alumina from aluminum chloride and washing the precipitated alumina with water containing ammonium hydroxide to remove chloride ions to an amount of about 0.1 percent by weight of alumina. A dilute aqueous solution of hydrogen chloride is added to the washed precipitated alumina in an amount to give the desired concentration of fluorine. A chloroplatinic acid solution having hydrogen sulfide intermingled therewith, and containing sufficient platinum to give the desired amount of platinum in the finished catalyst, is admixed with the fluorine-containing alumina, and the resulting composite is heated to a temperature of from about 800 to about 1200° F. The catalyst is then reduced or conditioned with hydrogen after being placed in the reforming vessel. Other known reforming catalysts such as cobalt-molybdate, molybdenum-alumina, and chromia-alumina can also be employed.

In reforming straight run gasoline fractions boiling, for example, in the range of about 150 to 400° F., the operating conditions of the reforming zone may vary considerably, but, in general, a temperature within the range of about 500 to 1000° F., preferably 875 to 925° F., a pressure within the range of about 450 to 850 p.s.i.g., preferably 475 to 525 p.s.i.g., and a volume space velocity ranging from about 0.2 to 5 volumes of charge per volume of catalyst per hour, preferably 2.5 to 3.5 volumes per hour, is employed. Reforming operations will usually be carried out in the presence of hydrogen, present in the mol ratio of hydrogen to charge within the range of about 4:1 to 10:1, preferably about 8:1.

The following examples will serve to illustrate specific applications of my invention, and should not be construed as limitations therefor.

EXAMPLE I

One hundred milliliter samples of a straight run gasoline fraction which contained 0.008 weight percent sulfur (mercaptan sulfur measured as sulfur) were each contacted with varying amounts of commercially available Linde Molecular Sieve 13–X. Linde Molecular Sieve 13–X has average pore diameters of about 13 angstroms. The contact time allowed for each sample was 5 minutes. At the end of the 5 minute period, each of the samples was analyzed to determine the sulfur content. The weight percent of residual sulfur in each sample and the amount of molecular sieve utilized for contacting each sample is shown in the table below.

Table I

| Grams 13–X: | Wt. percent residual sulfur |
| --- | --- |
| 0 | 0.0080 |
| 5 | 0.0054 |
| 10 | 0.0036 |
| 15 | 0.0013 |
| 20 | 0.0000 |

It can be seen from these data that by contacting 100 milliliters of sour gasoline with 20 grams of molecular sieve having pore diameter of about 13 angstroms for 5 minutes' contact time, complete removal of mercaptan sulfur was effected.

EXAMPLE II

A similar run was made with a sulfur-containing straight run gasoline fraction in which the mercaptan sulfur had been converted to disulfides by contacting the sour gasoline fraction with a dry copper chloride sweetening reagent before contacting it with the molecular sieve. The sweetened gasoline was then contacted with commercially available Linde Molecular Sieve 13–X having average pore diameters of about 13 angstroms. One gasolonie sample was analyzed for octane number, rated both clear and with lead, after copper sweetening, and the other sample was similarly analyzed after being copper sweetened and then contacted with the molecular sieve.

The research octane number for the gasoline sample which had been only copper sweetened was 69.6 clear, and 86.1 with 3 cc. of TEL. The research octane number for the sample being both copper sweetened and contacted with molecular sieve was 69.6 clear, but, with 3 cc. of TEL the actane number was 87.7.

Thus, it can be seen from the above data that the octane number is increased (RON with 3 cc. TEL) by 1.6 points. This increase was equivalent to adding 0.8 cc. of TEL to the 86.1 octane material to produce 87.7 octane. Thus, it can be seen that the TEL savings are appreciable. It should be further noted that the sulfur removal materially improved the lead response of the treated gasoline. Further, the octane number of 69.6 (no TEL) on treated and untreated gasolines in Example II, appear to show no removal of normal paraffins by the molecular sieve adsorption step.

From the above described data, it can be seen that by the practice of my invention not only substantially complete sulfur removal can be obtained from gasoline fractions, but also the sulfur removal can be obtained without materially affecting the individual hydrocarbons present in the gasoline fraction, especially normal paraffins. Thus, the invention is particularly useful not only in purifying the charge to the reforming zone in that sulfur compounds are removed to prevent contamination of the reforming catalyst, but also the normal paraffins present in the reforming charge stock are not removed, thereby providing a highly desirous reforming feed.

While the invention has been described employing molecular sieve adsorbents or other solid adsorbents having average pore diameters of at least 8 angstroms to treat liquid hydrocarbons, it is to be understood that the invention is also applicable where molecular sieve adsorbents are employed to treat gaseous or vaporous hydrocarbons for sulfur removal. Obviously, different charging stocks will contain compounds having various molecular sizes, i.e., depending upon a particular hydrocarbon fraction selected for treatment, the hydrocarbons present therein and/or the sulfur compounds therein may vary widely with respect to their molecular sizes. Therefore, in order to select the molecular sieve adsorbent best adapted to the process of this invention, one skilled in the art in possession of this disclosure will be able by routine testing of a series of sieve materials, each having a pore diameter different from the size of the others under test, to determine that which is best to use. Clearly, from the foregoing description, one skilled in the art, studying the same, will have noted that not all molecular sieve adsorbents are suitable for the proper practice of the present invention.

As will be evident to those skilled in the art, various other modifications to the invention can be made in view of the above disclosure and discussion without departing from the spirit or scope of the invention.

I claim:

1. A process for selectively removing disulfides from gasoline fractions previously sweetened, which comprises contacting said gasoline fraction with a molecular sieve adsorbent material having rigid three dimensional anionic networks and having average pore diameters of about 13 angstroms, and recovering a gasoline product having an improved lead response.

2. A process for selectively removing disulfides from a sweetened gasoline fraction which comprises contacting said gasoline fraction with a copper chloride sweetening reagent, contacting the thus sweetened gasoline fraction with a molecular sieve adsorbent material having rigid three dimensional anionic networks and having average pore diameters of about 13 angstroms to remove disulfides from said fraction.

3. A process for selectively removing disulfides from a sweetened gasoline fraction boiling within the range of 150–400° F., which comprises contacting said gasoline fraction with a copper chloride sweetening reagent to convert mercaptan sulfur to disulfides, contacting said sweetened gasoline fraction with a molecular sieve adsorbent material having rigid three dimensional anionic networks and having average pore diameters of about 13 angstroms within a temperature range of 70–200° F., and a pressure ranging from atmospheric to 600 p.s.i.g. to remove disulfides therefrom, and yielding a gasoline product exhibiting an improved lead response.

4. A process for the production of an improved gasoline boiling range material comprising the steps of recovering gasoline from a gasoline producing zone, contacting said gasoline with caustic to remove $H_2S$ and light mercaptans, contacting said gasoline with a sweetening reagent to convert remaining mercaptans to disulfides, and thereby providing a doctor-sweet gasoline, contacting said sweetened gasoline with a molecular sieve adsorbent material having rigid three dimensional anionic networks and having average pore diameters of about 13 angstroms to selectively remove disulfides, and recovering gasoline having an improved TEL response as a product of the process.

5. A process for the production of an improved gasoline boiling range material comprising the steps of recovering gasoline from a gasoline producing zone, contacting said gasoline with caustic to remove $H_2S$ and light mercaptans, contacting said gasoline with a cupric chloride impregnated clay sweetening reagent to convert remaining mercaptans to disulfides and thereby providing a doctor sweet gasoline, contacting said sweetened gasoline with a molecular sieve adsorbent material having rigid three dimensional anionic networks and having average pore diameters of about 13 angstroms in a first adsorption zone to selectively adsorb disulfides from said gasoline and thereby yielding a gasoline of improved anti-knock characteristics as a product of the process, contacting used adsorbent in said adsorption zone with hydrogen recovered from a catalytic reforming unit to desorb disulfides therefrom and thereby regenerating said used adsorbent, separating said desorbed disulfides from said hydrogen, and returning said hydrogen to said reforming zone.

6. A process for the production of an improved gasoline boiling range material comprising the steps of recovering gasoline from a gasoline producing zone, contacting said gasoline with caustic to remove $H_2S$ and light mercaptans, contacting said gasoline with a cupric chloride impregnated clay sweetening reagent to convert remaining mercaptans to disulfides and thereby providing a doctor sweet gasoline, contacting said sweetened gasoline with a molecular sieve adsorbent material having rigid three dimensional anionic networks and having average pore diameters of about 13 angstroms in a first adsorption zone to selectively adsorb disulfides from said gasoline and thereby yielding a gasoline of improved anti-knock characteristics as a product of the process, and contacting used adsorbent in said adsorption zone with at least a portion of the gases produced in said gasoline forming zone after sulfur removal from said gases to desorb disulfides from said adsorbent and thereby regenerating said used adsorbent.

7. A process for selectively removing disulfides from a previously sweetened distillate fraction which comprises contacting said fraction with a molecular sieve solid adsorbent having rigid three dimensional anionic networks and having average pore diameters ranging from 8 to about 20 angstroms, and recovering a distillate product substantially free of disulfides.

8. A process according to claim 7 wherein said distillate fraction is a sweetened gasoline fraction and said product has an improved lead response.

References Cited in the file of this patent

UNITED STATES PATENTS

| | | |
|---|---|---|
| 2,270,058 | Jones | Jan. 13, 1942 |
| 2,758,064 | Haensel | Aug. 7, 1956 |
| 2,818,449 | Christensen et al. | Dec. 31, 1957 |
| 2,882,244 | Mitton | Apr. 14, 1959 |

FOREIGN PATENTS

| | | |
|---|---|---|
| 449,783 | Great Britain | June 19, 1936 |
| 777,233 | Great Britain | June 19, 1957 |

OTHER REFERENCES

"Chemical to Engineering News," vol. 32; page 4786; November 29, 1954; CSI.

"Physical Properties of Linde Molecular Sieves, Types 42, 52, 13X," Form 9947, 2 pages.